United States Patent [19]

Erdmann et al.

[11] Patent Number: 4,723,983
[45] Date of Patent: Feb. 9, 1988

[54] APPARATUS FOR PRODUCING HIGHLY CURVED SHEETS OF GLASS

[75] Inventors: Wolfgang Erdmann, Ratingen; Gottfried Strauss, Heiligenhaus; Gerd Bischoff, Bretten, all of Fed. Rep. of Germany

[73] Assignee: Techno Glas Engineering GmbH, Ratingen, Fed. Rep. of Germany

[21] Appl. No.: 887,788

[22] Filed: Jul. 17, 1986

[30] Foreign Application Priority Data

Jul. 17, 1985 [DE] Fed. Rep. of Germany ....... 3525451

[51] Int. Cl.⁴ ............................................. C03B 23/03
[52] U.S. Cl. ...................................... 65/268; 65/104; 65/273; 65/287; 65/289
[58] Field of Search ................. 65/104, 268, 273, 287, 65/289

[56] References Cited

U.S. PATENT DOCUMENTS

| | | | |
|---|---|---|---|
| 3,459,521 | 8/1969 | Nedelec | 65/104 X |
| 3,529,947 | 9/1970 | Frank. | |
| 3,600,150 | 8/1971 | Rougeux | 65/289 X |

FOREIGN PATENT DOCUMENTS 1070318 6/1967 United Kingdom.
1307752 2/1973 United Kingdom.
1337199 11/1973 United Kingdom.

*Primary Examiner*—Arthur Kellogg
*Attorney, Agent, or Firm*—Becker & Becker, Inc.

[57] ABSTRACT

An apparatus for producing highly curved, tempered sheets of glass. A horizontal, continuous conveyer is provided for transporting planar sheets of glass into an electrically heated, oscillating or continuously operating horizontal hearth-type furnace for softening the glass. A stationary combined bending and cooling station is essentially disposed directly after the furnace, and includes a vertical bending press and a fixed lower bending mechanism in which, in the first phase, a sheet of glass receives the desired shape, and in a second phase is tempered. Fixed coolant connections are provided on the vertical bending press and on the lower bending mechanism for providing coolant to the bending press and lower bending mechanism.

16 Claims, 6 Drawing Figures

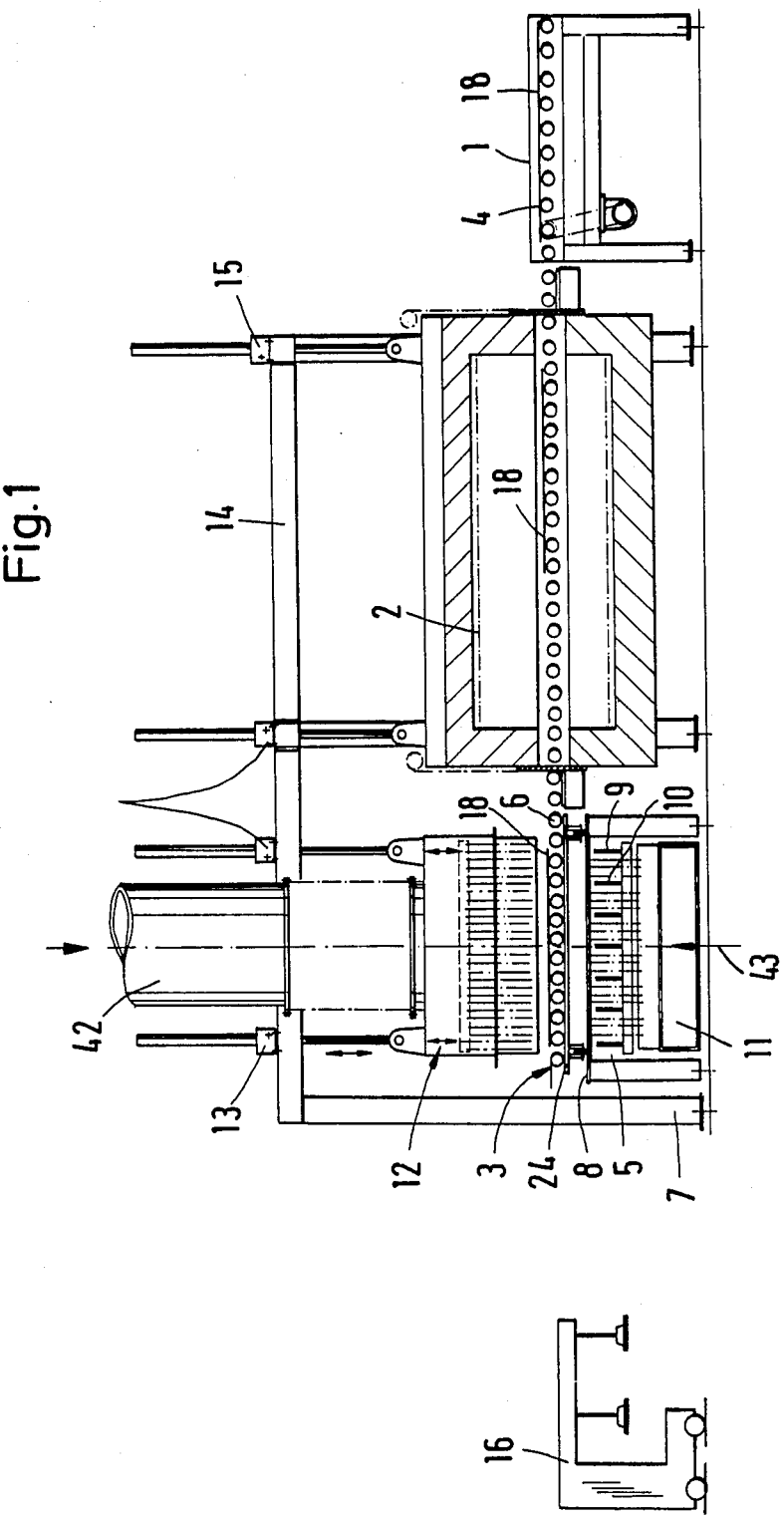

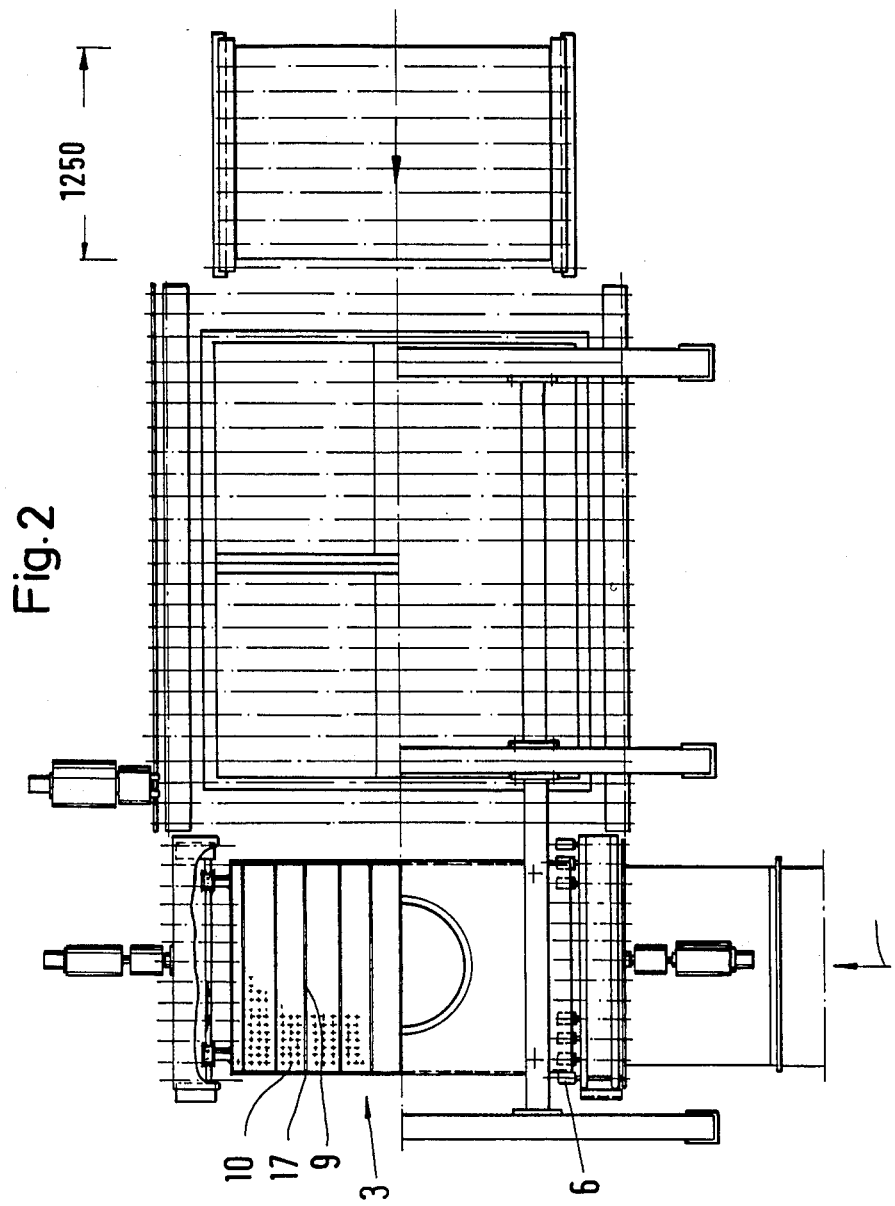

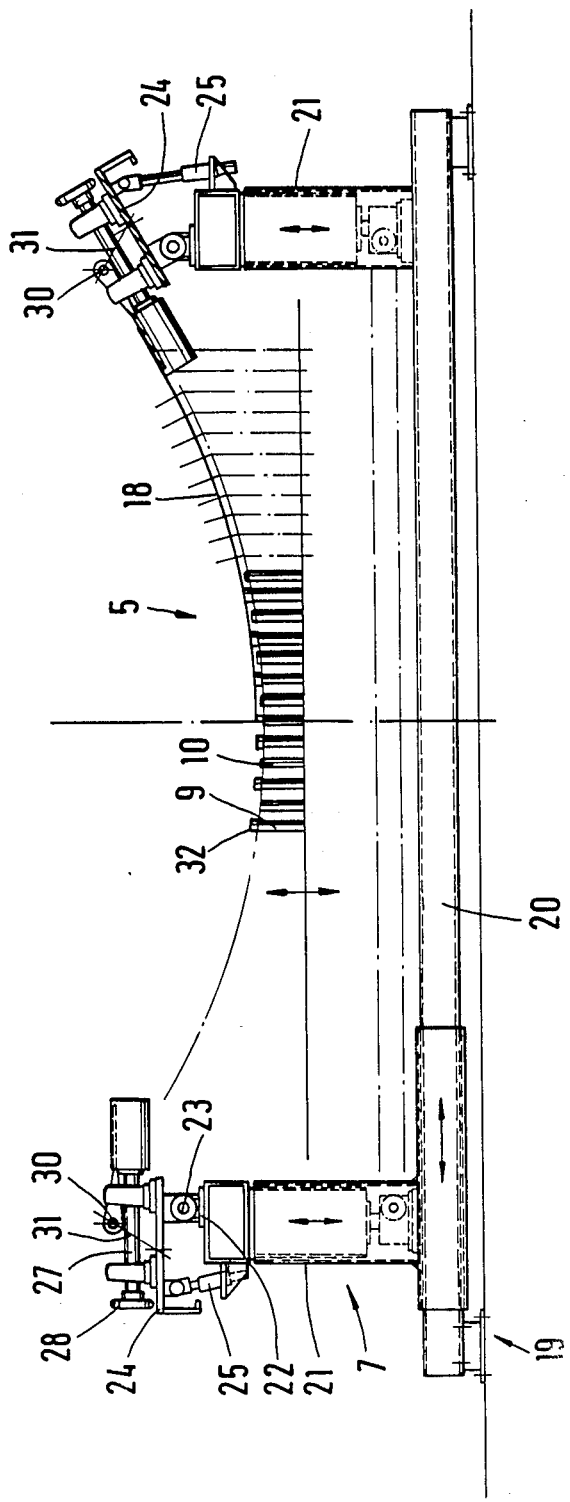

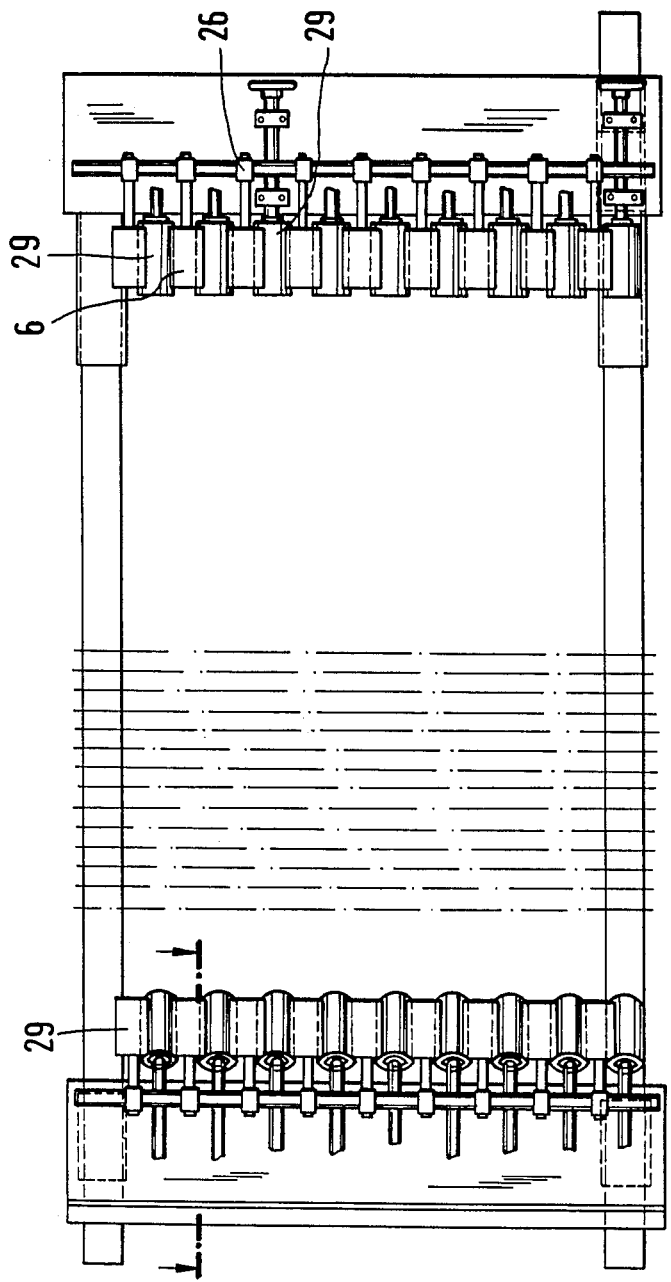

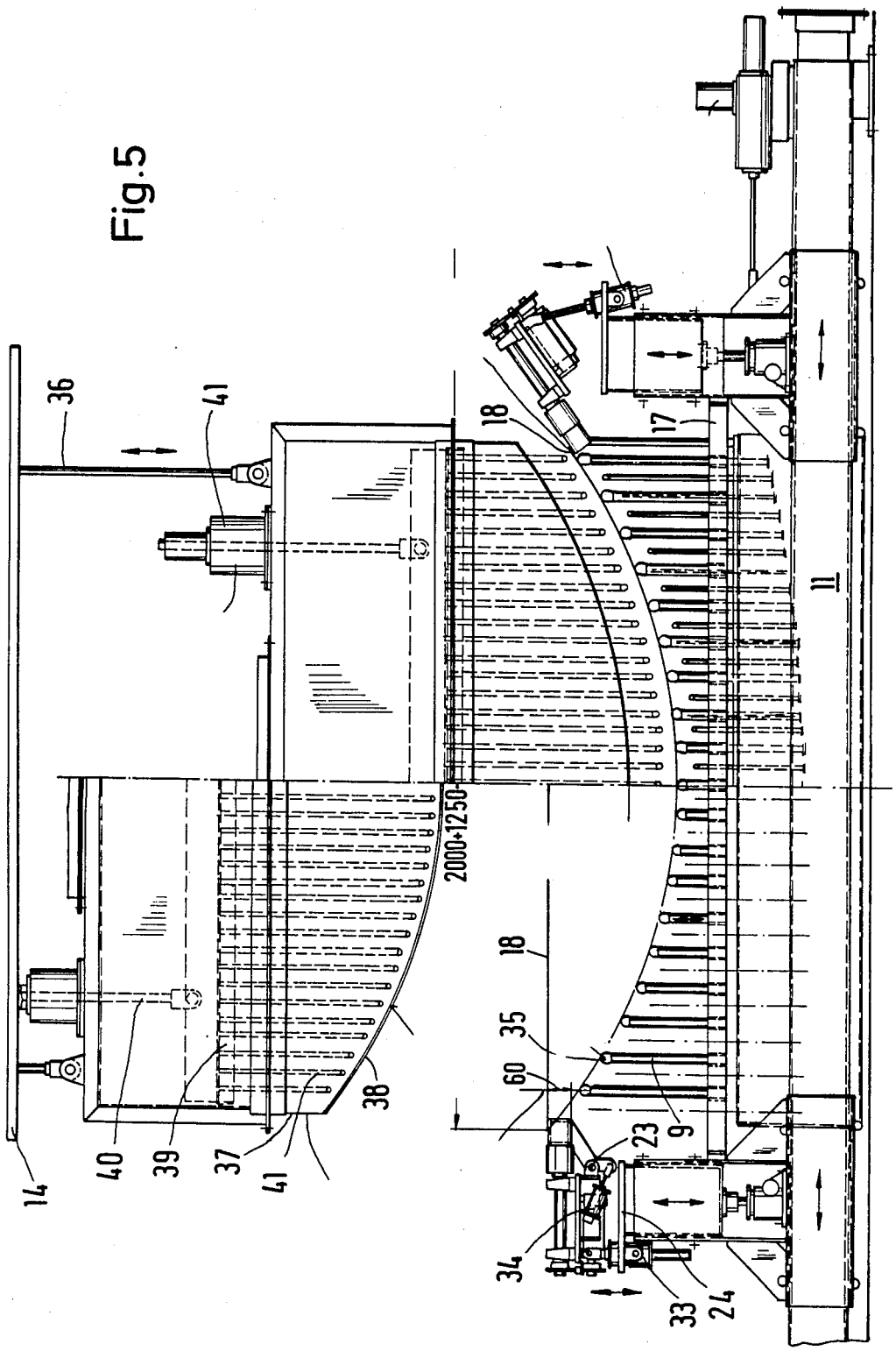

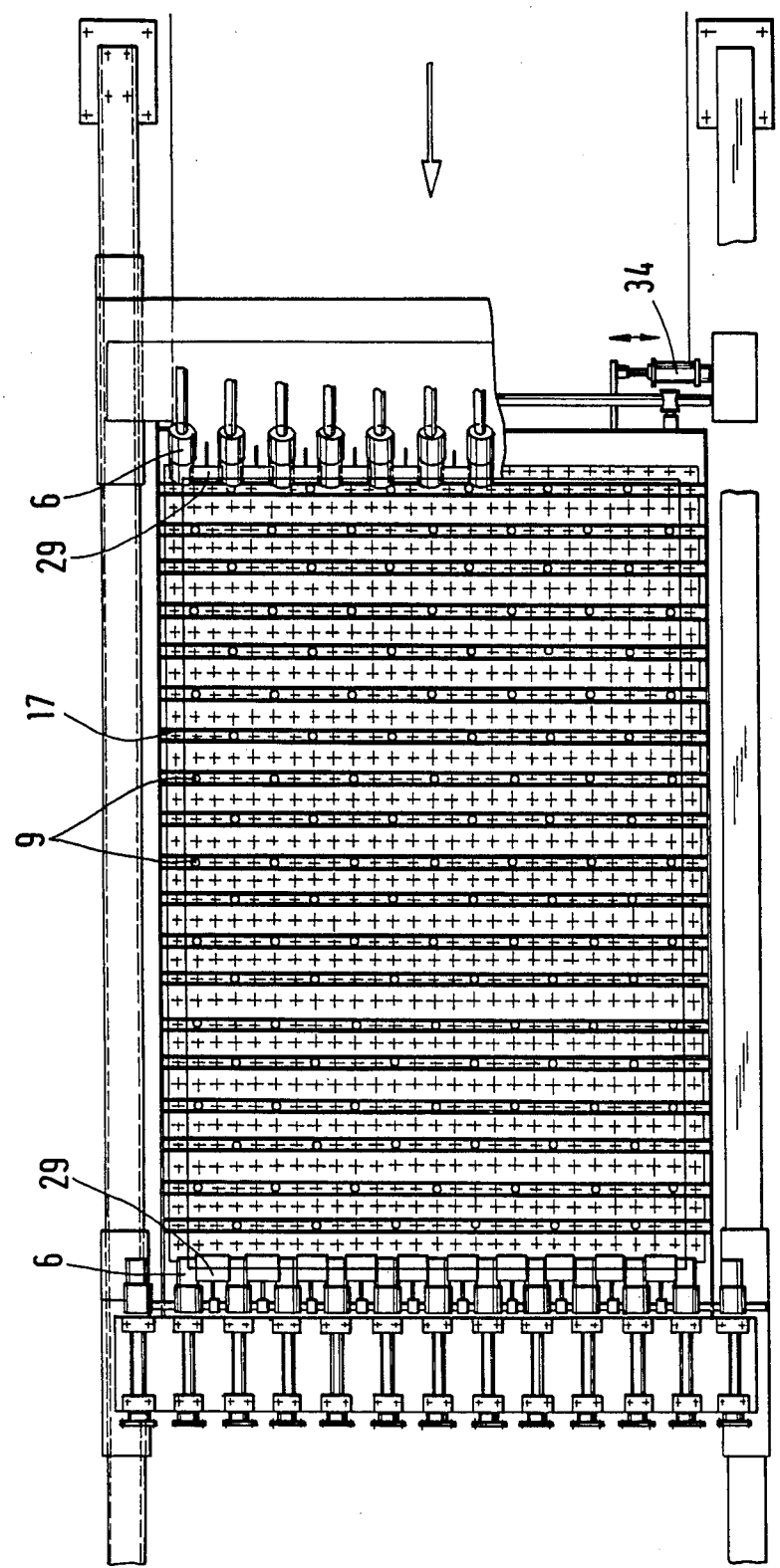

APPARATUS FOR PRODUCING HIGHLY CURVED SHEETS OF GLASS

BACKGROUND OF THE INVENTION

The present invention relates to an apparatus for producing highly curved sheets of glass.

DE-OS 29 42 738 discloses an apparatus for bending sheets of glass. This apparatus is provided with a horizontal conveyer for transporting the planar glass sheet into a furnace in which the latter is heated to the softening temperature. Disposed after the furnace is a bending station to which is connected, in turn, a separate cooling station for cooling the sheets of glass that were bent in the bending station. The bending station is provided with a lower bending mold and an upper vacuum bending mold. The surfaces of these molds are curved in conformity with the desired shape of the sheet that is to be bent. The lower bending mold can be raised and lowered, and can be removed from a lower mold support in order to be able to adapt and exchange the mold in conformity to various requirements. A change of the mold is required as soon as a different outer contour must be bent, even if this new size has the same radius of curvature as the previously processed sample.

The upper bending mold is embodied as a vacuum bending mold that can be removed from a support plate in order to enable change to another bending mold if differently shaped models are to be produced. Via an annular support member, the bent sheet of glass is then conveyed to the subsequent cooling station, where the cooling process is carried out to achieve tempering of the sheet of glass.

It is a drawback to convey the sheet in the heated state from the bending position into the cooling position while having to leave the bending station. Expensive and complicated transport mechanisms must be utilized that increase the danger of damaging the surface. Furthermore, a temperature loss occurs during the transport process, thereby worsening the breaking pattern due to coarsening. A non-homogeneous breaking pattern can occur. In particular, large-surface sheets of building glass cannot be produced with the heretofore known apparatus.

With the object of providing an apparatus having a high operational efficiency, and which operates without the disadvantageous transport of the sheets of glass from the bending press to a separate cooling mechanism, and which furthermore enables bending within precise tolerances by avoiding the positioning difficulties in the transport mechanism as well as avoiding surface defects, DE-PS 34 07 173 proposed an apparatus for producing highly curved, tempered sheets of glass, especially automotive glass, according to which the bending press is combined with the cooling station, thus eliminating transport of the bent sheets of glass into the cooling station. For this purpose, utilized within the furnace are a vacuum lifting mechanism for raising the softened sheet of glass from the conveyer, and a lower bending mold that can be introduced into the furnace and onto which the softened sheet of glass can be lowered. Provided externally of the furnace is a vertical bending press that cooperates with the bending mechanism that can be moved out of the heating apparatus, and which initially enables the bending and subsequently the tempering of the sheets of glass via coolant connections.

The drawback of this known apparatus is that a complete vacuum lifting station must be accommodated in a hot furnace of approximately 700°. This requires the use of special refractory or high-temperature resistant materials that are extremely expensive; also required is an expensive and complicated construction which can operate in a disturbance-free manner under the aforementioned temperature conditions. Although this technology is controllable and economically usable for the manufacture of automotive glass, this is not possible with large-surface sheet of building glass, for example sheets having the dimensions of 1200×2500×6 mm. Due to the necessity for having to provide an expensive vacuum lifting mechanism, particular technical problems arise due to the brick that has to be used and which must be coated with a specific refractory material and must furthermore be perforated, so that the lifting process can be carried out in such a way that the glass is not scratched. It is expensive to provide perforations, and to undertake the coating of refractory material that corresponds therewith, without the result being sharp-edged transitions or other irregularities that can lead to damaging of the glass.

A further drawback is that the bending mechanism must be capable of being introduced into the furnace, since during the retention time in the furnace the bending mechanism is heated up, which adversely affects the subsequent cooling in the cooling station. Here also special refractory materials must be used.

Up to now, all of these drawbacks have made it impossible to carry out the production of highly curved, tempered, large-surface sheets of building glass with such an apparatus.

In view of this state of the art, it is an object of the present invention to provide an apparatus having a high operational capacity for producing highly curved, tempered, large-surface sheets, especially sheets of building glass, with this apparatus, while avoiding the aforementioned drawbacks, operating at reduced capital expense and therefore being cheaper, and also making it possible to bend and cool sheets, after they have been heated up, without complicated manipulations.

SUMMARY OF THE INVENTION

This object is inventively realized by the combination of the following features: a horizontal conveyor for transporting respective planar sheets of glass into an electrically heated, oscillating or continuously operating horizontal hearth-type furnace for softening the sheets of glass; a stationary combined bending and cooling station that is essentially disposed directly after the furnace, and includes a vertical bending press and a fixed lower bending mechanism in which, in a first phase, a sheet of glass receives the desired shape, and in a second phase is tempered; and fixed coolant connection means provided on the vertical bending press and the lower bending mechanism to provide coolant to the bending press and the bending mechanism. The essence of the invention consists in combining the up-to-now separated bending and cooling stations directly after the furnace in such a way that neither the bending mechanism that is introducible into the furnace nor the vacuum lifting mechanism disposed in the furnace are required.

In the hearth-type furnace utilized in the inventive apparatus, the planar sheet of glass is heated to 620° while being moved back and forth, and is then conveyed along the shortest path, i.e. practically without loss of temperature, into the combined bending and cooling station, which is connected directly after the furnace. A conveyer is eliminated if, pursuant to a preferred further development of the invention, the lower bending mechanism of the combined bending and cooling station is provided with short, driven support rollers that, in the direction of transport, are disposed in an overhung fashion on both sides of the sheet of glass that is to be treated; the support rollers can be pivoted downwardly. Support plates can be disposed between the support rollers in the support plane; these support plates can be pivoted downwardly along with the support rollers. With this construction, it is possible to move the sheet of glass directly out of the furnace and into the combined bending and cooling station without separate conveying means, with the sheet of glass that is to be shaped being held in a frame-like fashion by the support rollers along with the support plates disposed therebetween.

The pivotable support plates and support rollers are expediently secured on respective support plates disposed on both sides of the combined bending and cooling station; these latter support plates are pivotable about swivel members either mechanically or via a pneumatic cylinder. The arrangement of the support plates on the swivel members is adjustable in height via support members that are telescopically extendable and adjustable, and which in turn are secured to a mounting base, the width of which can be adjusted. Thus, due to the possibility for adjusting the height, the width, and the angle of inclination of the support mechanism for the sheets, any relative movement between the support rollers or support plates and the glass is avoided from the time the flat sheet of glass achieves the final transport position in the combined bending and cooling station up to termination of the bending process when the previously set bending line has been achieved. In this connection, the dynamic and static conditions between the sheet of glass, the support rollers, and the lower bending mechanism can be taken into account by an appropriate shape (contour) of the support rollers.

Instead of the up-to-now known adjustable, sheet-like bending supports, the lower bending mechanism is provided with a plurality of pin-like bending supports that are uniformly distributed, adjustable in height, and assure not only a low, specific surface pressure but also an optimum supply of air into the space between them. These bending supports are secured to a horizontal support frame that can be oscillated horizontally. The adjustability of the bending supports can be carried out via spindles. The pin-like bending supports can be provided either with support ends that can tangentially conform to the bending line along a plane, via joints, or spherical ends; in either case, the ends assure a low specific pressure.

In the preferred embodiment, the bending supports, when viewed in the direction of transport, are disposed in respective spaced-apart parallel rows. For example, for a sheet of glass having the dimensions of 2000 mm × 1500 mm, 19 rows of bending supports are required, with six or seven bending supports per row. Disposed between the bending supports are vertically adjustable nozzles for the supply of cooling air. The nozzles are secured on an air compartment that is disposed below the frame for the bending supports; one of the coolant connection is provided on this air compartment. In the preferred embodiment, 903 nozzles are uniformly distributed between the total of 123 bending supports in order to assure an optimum supply of air. To optimize the breaking pattern, cooling air is preferably also conveyed through the bending supports, which in this case are embodied in a nozzle-like fashion.

A vertical bending press in the combined bending and cooling mechanism cooperates with the lower bending mechanism. This bending press comprises a raisable and lowerable, exchangeable, convex bending mold that is provide with a lower bending plate which corresponds to the shape of the bending line of the sheet of glass. The bending plate is covered by a fiberglass blanket having openings for a plurality of nozzles. These nozzles are adjustaby secured in a separate nozzle plate that can be raised and lowered. Furthermore, the nozzles are connected to an air compartment that is connected with an appropriate air system for the supply of coolant.

After the planar sheet of glass has been introduced into the combined bending and cooling station, and has been precisely positioned via direct current drive and pulse-transmission position regulation, the bending press is lowered to the sheet of glass. At the same time, the support members and support plates are shifted until the bending line is achieved. The sheet of glass then rests upon the support elements. In this position, the bending process is terminated, with the cooling process then being initiated by raising the convex bending mold while the nozzle plate with the nozzles that are matched to the bending line is adjusted via its own lifting element to a distance of approximately 50 mm from the sheet of glass. The cooling process is then carried out. The entire described system of conveying and adjustment elements for the air nozzles and support elements, with which the molds of the upper and lower halves of the combined bending and cooling station can be adjusted in conformity to the sheet production, is preferably controlled by computer.

BRIEF DESCRIPTION OF THE DRAWINGS

Further details, features, and advantages of the subject matter of the present invention are presented in the following description of the associated drawings, which illustrate one apparatus for producing highly curved, tempered sheets of building glass, schematically as a whole and in detailed views. Shown in the drawings are:

FIG. 1 a schematic side view of one exemplary embodiment of an inventive apparatus for producing highly curved, tempered sheets of building glass, FIG. 2 a plan view of the apparatus of FIG. 1, FIG. 3 a cross-sectional view of a first exemplary embodiment of a lower bending mechanism of the combined bending and cooling station, FIG. 4 a plan view of the bending mechanism of FIG. 3, FIG. 5 a cross-sectional view of a second exemplary embodiment of the combined bending and cooling station, and FIG. 6 a plan view of the lower bending mechanism of the station of FIG. 5.

DESCRIPTION OF PREFERRED EMBODIMENTS

The overall apparatus illustrated in FIG. 1 of the drawings comprises a horizontal conveyer 1, a furnace 2 disposed directly thereafter when viewed in the direction of transport of the flat glass, and a combined bending and cooling station 3 connected directly after the furnace 2, again when viewed in the direction of transport. A roller conveyer having driven conveyer rollers 4 is utilized as the horizontal conveyer. The furnace 2 is an electrically heated, oscillating, horizontal hearth-type furnace in which the sheets of glass are continuously heated on ceramic rollers to approximately 620° C., and are subsequently shaped in the combined bending and cooling station 3 to achieve substantial curves, whereupon the sheets of glass are cooled off in a very short period of time to atmospheric temperature by means of large quantities of air. The thus resulting compressive and tension forces in the glass produce, when the sheet of glass is damaged, a broken glass structure that comprises small, harmless glass crumbs.

It should be noted that no separate conveyer is provided between the furnace 2 and the combined bending and cooling station 3. Due to a special configuration of the lower bending mechanism 5 with short support rollers 6, as will be described subsequently, an intermediate conveyer is eliminated and the bending and cooling station 3 can be disposed directly at the furnace 2. This also avoids temperature losses along the transport path between the furnace and the treatment station.

The lower bending mechanism 5 essentially comprises a vertical support frame 7, the supports of which on both sides of the sheet of glass are connected in the longitudinal direction by supports 8 on which the support rollers 6 are mounted. Between the vertical support frame 7, the lower bending mechanism 5 is provided with adjustable bending supports 9 and, disposed therebetween, nozzles 10 as cooling elements that communicate with an air compartment 11 that is connected to a cooling air system.

The upper part of the combined bending and cooling station 3 is formed by a vertical bending ram or press 12 that can be raised and lowered by lifting elements 13. The latter are held in a special lifting frame 14 that also supports the lifting elements 15 of the furnace.

Indicated schematically in FIG. 1 of the drawings is an unloading mechanism 16 for removing the finished bent and tempered glass from the bending and cooling station 3.

FIG. 2 of the drawings shows the apparatus of FIG. 1 as a plan view. In the combined bending and cooling station 3 thereof, in the upper half, the vertical bending press 12 is omitted so that it can be seen from the drawing how the nozzles 10 are disposed within a frame 17—extending therethrough—that carries the bending supports 9, which are in the form of pin-like support elements. As can be seen from FIG. 2, the support rollers 6 for the sheet of glass 18 are short and stub-like. The construction and function of the support rollers will be described in greater detail in connection with the subsequent more detailed description of the lower bending mechanism 5 of the first exemplary embodiment of FIGS. 3 and 4 of the drawings.

FIG. 3 is a cross-sectional view of the lower bending mechanism 5. The latter comprises a mounting base 19 having rail-like crossbeams 20 on which, in a laterally adjustable manner, are held support members 21 that form the vertical support frame 7. The height of the support members is adjustable, as indicated by the double arrow. The lateral and height adjustability makes it possible to exactly adjust the lower bending mechanism 5 to the dimensions and shape of the sheet of glass 18 that is to be bent.

Brackets 22 having swivel members 23 are secured to the support members 21 or the connecting supports 8. The swivel members, on each long side of the sheet of glass 18, carry a support plate 24 that extends in the longitudinal direction. On each side, the support plate 24 is pivotable about the swivel member 23, for which purpose a pneumatic cylinder 25 is provided. Different positions for the support plates 24 are schematically illustrated on the left and right sides of FIG. 3.

Secured to the two support plates 24 are brackets 26 for the overhung mounting of the support rollers 6, for the drive of which a gear wheel 28 is secured on the outer free end of the respective shaft 27. The gear wheels are connected via a chain drive or the like with a motor. Disposed between the individual support rollers 6 are additional support plates 29 that, together with the support rollers 6, can be pivoted between a horizontal position and a downwardly inclined position. The common pivotability is indicated in FIG. 3 by the line 31, which is drawn from the swivel mounting 30 of the support plates 29 to the support plate 24, and which is intended to make clear the functional connection.

Further components of the lower bending mechanism 5 are the adjustable bending supports 9 that form the bending plane, and the nozzles 10 that are disposed therebetween and serve for the supply of cooling air. In the exemplary embodiment illustrated in FIG. 3, the bending supports 9 are pin-shaped and have a separate support head 32, each of which, in order to achieve as low a specific surface pressure as possible, can be tangentially matched to the bending line via a non-illustrated joint. Pursuant to another exemplary embodiment, the bending supports 9 can have ball-shaped ends. Both the bending supports 9 and the nozzles 10 are vertically adjustable, which again is schematically indicated in FIG. 3 by a double arrow. Furthermore, the bending supports 9 can be oscillated horizontally by an appropriate mounting thereof and by an appropriate drive of their frame 17.

A modified embodiment of the lower bending mechanism 5 is illustrated in FIGS. 5 and 6 together with the vertical bending press 12. The essential modification of the lower bending mechanism 5 is in the construction of the mounting for the support roller 6 as well as for the support plates 29 disposed therebetween. Although common swivel members 23 are provided for supporting the support plates 24, the pivotability of the support rollers 6 downwardly can be carried via a pneumatic cylinder 33 independently of the downward pivoting of the support plates 29 via a separate pneumatic cylinder 34. The second essential modification is that the pin-like bending supports 9 are provided with ceramic ball-shaped ends 35.

FIG. 6 also shows the construction of the frame 17 for the bending supports 9. It can be seen that 19 rows of parallel and spaced-apart bending supports 9 are formed, so that a total of 123 support heads are provided for the sheet of glass that is provided in this exemplary embodiment and that has a size of 2000×1250 mm. The crosses diagrammatically indicate the number and arrangement of the nozzles. A total 903 nozzles are provided. On the right side of FIG. 6, an arrow symbolizes the supply of air into the air compartment 11, which can be removed in a simple manner from the mounting base.

The vertical bending press 12, which forms a part of the combined bending and cooling station 3, is similarly shown in detail in FIG. 5. Secured to the lifting frame 14 are lifting mechanisms 36 (clearly shown by a double arrow) which hold an exchangeable bending form or mold 37 in such a way that it can be raised and lowered.

The bending mold has a bending plate 38 that is shaped in conformity to the bending mold, and is covered with a fiberglass blanket. Two positions are illustrated.

Disposed in the bending mold 37 is a nozzle plate 39 that can be separately raised and lowered via its own lifting mechanism 40. Axially adjustably secured to the nozzle plate are a plurality of nozzles 41 that are connected to an air supply, which is indicated by an arrow. In this way it is possible, by lowering the vertical bending press 12, to bring the sheet of glass 18 between the bending plate 38 and the bending plane formed by the bending supports 9 into the desired shape, and to subsequently cool it. The sequence of operation of the overall apparatus for producing highly curved, tempered sheets of building glass is as follows:

First of all, via the horizontal conveyer 1, the planar sheet 18, which in the exemplary embodiment has the dimensions 2000×1250, is introduced into the furnace 2, where it is heated to approximately 620° C. while being subjected to back and forth movements. In the removal region from the furnace, the sheet of glass 18 is picked up directly by the driven support rollers 6, which are disposed on both sides in the longitudinal direction; the sheet of glass is then introduced into the combined bending and cooling station 3. In this connection, the support rollers 6 pick up only the longitudinal hedge region of the sheet of glass 18 in the manner of a frame. After a controlled stop of the sheet 18 in the bending and cooling position, the sheet is positioned precisely on the support plates 29 by a downward pivoting of the support rollers 6, or by raising the support plates 29. The positioning can be undertaken by direct current drive mechanisms and pulsetransmission support-control, as well as by stops or optoelectronic switch elements.

By lowering the vertical bending press 12, shaping of the sheet of glass 18 is now undertaken, whereby at the same time the support rollers 6 and the support plates 29 are moved into the right angular position in the bending line illustrated in FIGS. 3 and 5. The left position shown in these figures shows the combined bending and cooling station, and the lower bending mechanism, in the starting position.

When the bending plane is reached, the sheet of glass 18 rests upon the bending supports 9, and is thus brought into the desired shape. In order to now initiate the tempering process, the bending mold 37 is raised slightly, as illustrated on the right side of FIG. 5. At the same time, the nozzles 41 along with the nozzle plate 39 are moved to the correct, slight distance from the sheet of glass 18 via their own adjustment mechanisms 41. Immediately thereafter, cooling air is introduced from above, and shortly thereafter also from below, via the nozzles 41 and 10, by opening air flaps, onto the surface of the sheet of glass. The bending supports 9, along with the frame 17, are oscillated horizontally in order to assure an optimum cooling. The described system also makes it possible to evacuate air therefrom in an excellent manner, so that on the whole an extremely uniform breaking pattern is achieved.

After termination of the tempering process, the vertical bending press 12, along with the lifting mechanisms 36, are raised and the now finally shaped and tempered sheet of glass 18 can be removed by the unloading mechanism 16 from the combined bending and cooling station 3.

With the described apparatus, it is for the first time possible to produce highly curved, large-surface single-pane safety glass or building glass, for example for so-called skylights, without surface defects such as clamp or gripper points or the like occurring. The vacuum lifting mechanisms within the furnace that have been known for a long time from the manufacture of automotive sheets of glass are eliminated, and the overall expense for equipment is considerably reduced. Existing horizontal tempering equipment can be converted. As a consequence of the simple operating principle, there results not only a straightforward flow of material, but also an increased speed of production, so that ultimately also a particularly economical production is achieved.

The present invention is, of course, in no way restricted to the specific disclosure of the specification and drawings, but also encompasses any modifications within the scope of the appended claims.

We claim:

1. An apparatus for producing highly curved, tempered sheets of glass, comprising:
   a horizontal conveyer for transporting respective planar sheets of glass into an electrically heated, oscillating or continuously operating horizontal hearth-type furnace for softening said sheets of glass;
   a stationary combined bending and cooling station that is essentially disposed directly after said furnace, and includes a vertical bending press and a fixed lower bending mechanism in which, in a first phase, a sheet of glass receives the desired shape, and in a second phase is tempered, with said lower bending mechanism being provided with short, driven support rollers which, when viewed in the direction of transport of a sheet of glass that is to be treated, are disposed in an overhung manner relative to the two sides of said sheet of glass, with said support rollers being pivotable downwardly; and
   fixed coolant connection means provided on said vertical bending press and said lower bending mechanism to provide coolant to said bending press and said bending mechanism.

2. An apparatus according to claim 1, in which said lower bending mechanism is further provided with first support plates that are disposed in the support plane between said support rollers, and are pivotable downwardly along with the latter.

3. An apparatus according to claim 2, in which said pivotable support rollers and first support plates are secured to respective second support plates that are respectively pivotably mounted on the two sides of said lower bending mechanism via swivel members.

4. An apparatus according to claim 3, in which said second support plates are mechanically pivotable.

5. An apparatus according to claim 3, which includes pneumatic cylinder means for effecting pivoting of said second support plates.

6. An apparatus according to claim 5, in which said lower bending mechanism includes a mounting base on which telescopically extendible and adjustable support members are mounted in such a way that the distance between respective support members on the two sides of said bending mechanism can be varied, with the height of said second support plates on said swivel members being adjustable via said support members.

7. An apparatus according to claim 3, in which said lower bending mechanism further includes a plurality of uniformly distributed pin-like bending supports, the height of which is adjustable.

8. An apparatus according to claim 7, in which said lower bending mechanism includes a horizontal support frame that can be oscillated horizontally, and on which said bending supports are mounted.

9. An apparatus according to claim 8, which includes adjustment elements to provide for vertical adjustment of said bending supports.

10. An apparatus according to claim 7; in which said bending supports are provided with support heads that tangentially conform to the bending line along a plane and via joints.

11. An apparatus according to claim 7, in which said bending supports are provided with ball-shaped ends.

12. An apparatus according to claim 8, in which, when viewed in the direction of transport of a sheet of glass, said bending supports are disposed in parallel, spaced-apart rows; and which includes vertically adjustable nozzles that are disposed between said rows and are connected to said coolant connection means of said lower bending mechanism for receiving cooling air therefrom.

13. An apparatus according to claim 12, which includes an air compartment that is disposed below said support frame for said bending supports, and that is provided with said coolant connection means of said lower bending mechanism, with said nozzles being secured to said air compartment.

14. An apparatus according to claim 12, which includes a plurality of said nozzles and said bending supports.

15. An apparatus according to claim 8, in which said vertical bending press includes an exchangeable convex bending mold that can be raised and lowered and is provided with a lower bending plate that corresponds to the shape of the bending line of the sheet of glass that is to be treated; said bending plate is covered with a fiberglass blanket having openings for a plurality of further nozzles that are connected to said coolant means of said bending press; and in which said vertical bending press further includes a nozzle plate that can be raised and lowered, and in which said further nozzles are adjustably secured.

16. An apparatus according to claim 15, that is suitable for the production of sheets of glass having a dimension of 2000 mm × 1500 mm × 6 to 8 mm, and a radius of curvature of from 0.5 to 1.5 m.

* * * * *